(12) United States Patent
Gossweiler et al.

(10) Patent No.: US 8,666,123 B2
(45) Date of Patent: Mar. 4, 2014

(54) CREATING SOCIAL NETWORK GROUPS

(75) Inventors: Rich Gossweiler, Sunnyvale, CA (US); James Brooks Miller, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/456,970

(22) Filed: Apr. 26, 2012

(65) Prior Publication Data

US 2013/0287269 A1    Oct. 31, 2013

(51) Int. Cl.
*G06K 9/00* (2006.01)

(52) U.S. Cl.
USPC .......................................... 382/118; 382/181

(58) Field of Classification Search
USPC ......................................................... 382/118
See application file for complete search history.

(56) References Cited

U.S. PATENT DOCUMENTS

| | | | |
|---|---|---|---|
| 6,606,398 B2 * | 8/2003 | Cooper | 382/118 |
| 7,187,787 B2 * | 3/2007 | Milne et al. | 382/118 |
| 7,756,334 B2 * | 7/2010 | Kim et al. | 382/181 |
| 7,783,085 B2 | 8/2010 | Perlmutter | |
| 7,822,233 B2 * | 10/2010 | Nagaoka et al. | 382/118 |
| 8,094,891 B2 * | 1/2012 | Andreasson | 382/118 |
| 8,264,327 B2 * | 9/2012 | Fujita | 340/5.83 |
| 8,280,175 B2 * | 10/2012 | Itonori | 382/224 |
| 8,379,979 B2 * | 2/2013 | Yu et al. | 382/173 |
| 2004/0156535 A1 * | 8/2004 | Goldberg et al. | 382/115 |
| 2008/0140650 A1 * | 6/2008 | Stackpole | 707/5 |
| 2008/0270425 A1 | 10/2008 | Cotgreave | |
| 2009/0252383 A1 | 10/2009 | Adam | |
| 2010/0172550 A1 | 7/2010 | Gilley | |
| 2011/0026853 A1 | 2/2011 | Gokturk | |
| 2011/0038512 A1 | 2/2011 | Petrou | |
| 2011/0148857 A1 | 6/2011 | Krupka | |
| 2011/0182482 A1 | 7/2011 | Winters | |
| 2011/0211737 A1 | 9/2011 | Krupka | |

OTHER PUBLICATIONS

International Search Report for Application No. PCT/US13/38171, dated May 20, 2013.

* cited by examiner

*Primary Examiner* — Michelle Entezari
(74) *Attorney, Agent, or Firm* — IP Spring (57) ABSTRACT

Embodiments generally relate to creating groups in a social network system. In one embodiment, a method includes recognizing at least one person in the at least one photo associated with a target user in a social network system, where the recognizing is based at least in part on social relevance. The method also includes creating a group in the social network system, where the group includes the at least one person recognized in the at least one photo. The method also includes associating the group with the target user.

20 Claims, 4 Drawing Sheets

CREATING SOCIAL NETWORK GROUPS

TECHNICAL FIELD

Embodiments relate generally to social network systems, and more particularly to creating groups in a social network system.

BACKGROUND

Social network systems typically enable users to create social network groups. For example, such social network groups may include groups of friends or groups of contacts. To create a group, a user of a social network system typically finds other users by performing a search, and then invites them to connect socially as friends or as contacts. A recipient of an invitation can respond by accepting the invitation, which creates a social connection. Once the social connection is made, the users can belong to each others groups and can engage via various social activities. For example, users can visit each other's profile pages, follow each other's posts, send messages to each other, etc.

SUMMARY

Embodiments generally relate to creating groups in a social network system. In one embodiment, a method includes recognizing at least one person in at least one photo associated with a target user in a social network system, where the recognizing is based at least in part on social relevance; creating a group in the social network system, where the group includes the at least one person recognized in the at least one photo; and associating the group with the target user.

With further regard to the method, in one embodiment, the obtaining of the at least one photo includes obtaining the at least one photo from a camera device when the target user takes the at least one photo. In one embodiment, the recognizing of the at least one person includes: identifying at least one face; and applying a facial recognition algorithm to the at least one face. In one embodiment, the recognizing is based at least in part on a degree of social relevance between a candidate person and the target user. In one embodiment, the recognizing of the at least one person includes: identifying at least one face; and applying a facial recognition algorithm to the at least one face, where the applying of the facial recognition algorithm to the at least one face includes: matching facial features of the at least one face to facial features of at least one known face in a database, where the at least one known face is associated with a candidate person; determining the degree of social relevance between the candidate person and the target user; and determining the candidate person to be the at least one person in the at least one photo based on the degree of social relevance.

With further regard to the method, in one embodiment, the method also includes enabling the target user to verify that the at least one person recognized in the at least one photo is correctly recognized. In one embodiment, the method also includes enabling the target user to verify that the at least one person recognized in the at least one photo is correctly recognized; and enabling the target user to modify identification information associated with one or more people in the group if any person is incorrectly recognized. In one embodiment, the method also includes providing the group to the target user. In one embodiment, the method also includes notifying the at least one person recognized in the at least one photo that the group has been created. In one embodiment, the method also includes sending an invitation to join the group to the target user and the at least one person recognized in the at least one photo.

In another embodiment, a method also includes recognizing at least one person in at least one photo associated with a target user in a social network system, where the recognizing is based at least in part on social relevance, where the recognizing of the at least one person includes identifying at least one face, and applying a facial recognition algorithm to the at least one face. In one embodiment, the applying of the facial recognition algorithm to the at least one face includes: matching facial features of the at least one face to facial features of at least one known face in a database, where the at least one known face is associated with a candidate person; determining a degree of social relevance between the candidate person and the target user; and determining the candidate person to be the at least one person in the at least one photo based on the degree of social relevance. In another embodiment, a method also includes: creating a group in the social network system, where the group includes the at least one person recognized in the at least one photo; enabling the target user to verify that the at least one person recognized in the at least one photo is correctly recognized; enabling the target user to modify identification information associated with one or more people in the group if any person is incorrectly recognized; and associating the group with the target user.

In another embodiment, a system includes one or more processors, and logic encoded in one or more tangible media for execution by the one or more processors. When executed, the logic is operable to perform operations including: recognizing at least one person in the at least one photo associated with a target user in a social network system, where the recognizing is based at least in part on social relevance; creating a group in the social network system, where the group includes the at least one person recognized in the at least one photo; and associating the group with the target user.

With further regard to the system, in one embodiment, to obtain the at least one photo, the logic when executed is further operable to perform operations comprising obtaining the at least one photo from a camera device when the target user takes the at least one photo. In one embodiment, to recognize the at least one person, the logic when executed is further operable to perform operations comprising: identifying at least one face; and applying a facial recognition algorithm to the at least one face. In one embodiment, the recognizing is based at least in part on social relevance between a candidate person and the target user. In one embodiment, to recognize the at least one person, the logic when executed is further operable to perform operations comprising: identifying at least one face; and applying a facial recognition algorithm to the at least one face. In one embodiment, the applying of the facial recognition algorithm to the at least one face includes: matching facial features of the at least one face to facial features of at least one known face in a database, where the at least one known face is associated with a candidate person; determining the degree of social relevance between the candidate person and the target user; and determining the candidate person to be the at least one person in the at least one photo based on the degree of social relevance.

With further regard to the system, in one embodiment, the logic when executed is further operable to perform operations comprising enabling the target user to verify that the at least one person recognized in the at least one photo is correctly recognized. In one embodiment, the logic when executed is further operable to perform operations comprising: enabling the target user to verify that the at least one person recognized in the at least one photo is correctly recognized; and enabling the target user to modify identification information associated with one or more people in the group if any person is incorrectly recognized. In one embodiment, the logic when executed is further operable to perform operations comprising providing the group to the target user. In one embodiment, the logic when executed is further operable to perform operations comprising notifying the at least one person recognized in the at least one photo that the group has been created.

DETAILED DESCRIPTION

Embodiments described herein facilitate the creation of social network groups in a social network system. In various embodiments, a system generates groups for users of the social network system in response to photos associated with the users. For example, the system may generate a group that includes friends shown in a photo.

As described in more detail below, in one embodiment, the system recognizes one or more people in one or more photos associated with a target user in a social network system. For example, the photos may be associated with the target user in that the target user took the photos and/or uploaded the photos to the social network system.

In one embodiment, the recognizing of the people is based at least in part on social relevance. For example, for each face (i.e., image of a face) in a photo, the system matches facial features of the face to facial features of at least one known face in a database, where the known face is associated with a candidate person. In some situations, where there are multiple candidates, the system determines a degree of social relevance between one or more candidates and the target user. The system then determines a candidate person to be a particular person in the photo based on the degree of social relevance. For example, if the target user and the candidate person are in each other's personal social network, there would be a high degree of social relevance and thus a high probability that the candidate person is the particular person in the photo. The system then creates a social network group that includes the one or more people recognized in the photo, and then associates the group with the target user.

Figure 1:
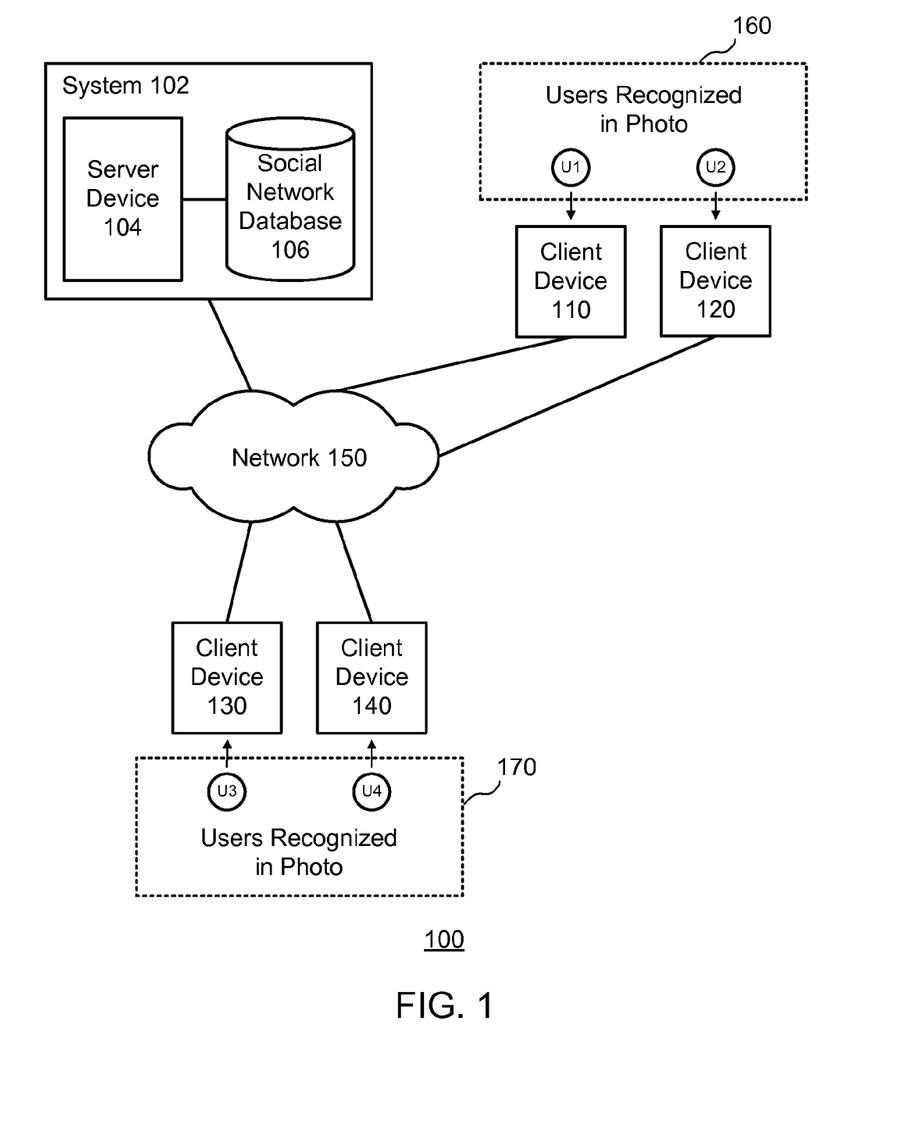
FIG. 1 illustrates a block diagram of an example network environment, which may be used to implement the embodiments described herein.

FIG. 1 illustrates a block diagram of an example network environment 100, which may be used to implement the embodiments described herein. In one embodiment, network environment 100 includes a system 102, which includes a server device 104 and a social network database 106. The term system 102 and phrase "social network system" may be used interchangeably. Network environment 100 also includes client devices 110, 120, 130, and 140, which may take photos and upload the photos to system 102 via a network 150. Client devices 110, 120, 130, and 140 may be camera devices. Client devices 110, 120, 130, and 140 may also be mobile phones, tablets, notebook computers, or any other electronic devices having camera capabilities. In various embodiments, users U1, U2, U3, and U4 may take photos using respective client devices 110, 120, 130, and 140, and upload the photos to system 102.

As described in embodiments herein, users U1, U2, U3, and U4 may have their images captured and then recognized in various combinations of photos. For example, a group 160 of users U1 and U2 may be recognized in one photo taken by a target user, while a group 170 of users U3 and U4 may be recognized in another photo taken by the target user. For ease of illustration, FIG. 1 shows users U1 and U2 in group 160 and shows users U3 and U4 in group 170. Each of groups 160 and 170 may have any number of users and have any combination of users U1, U2, U3, and U4, as well as other users. As described in more detail below, system 102 may create groups (i.e., social network groups) corresponding to the groups of users recognized on the photos. For example, system 102 may create a first social network group that includes users U1 and U2 and may create a second social network group that includes users U3 and U4. System 102 may then select one or both groups to present to the target user, and the target user may in turn select one or both groups to associate with the target user.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein.

Figure 2:
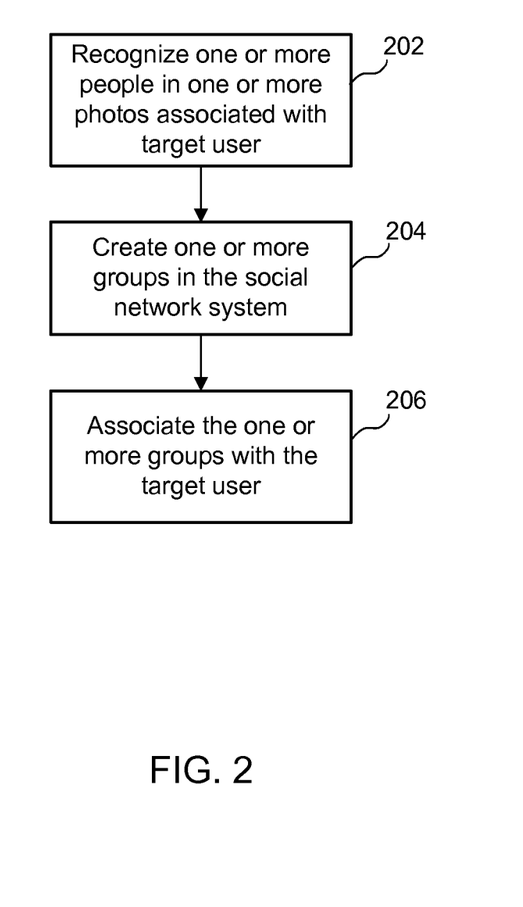
FIG. 2 illustrates an example simplified flow diagram for creating groups in a social network system, according to one embodiment.

FIG. 2 illustrates an example simplified flow diagram for creating groups in a social network system, according to one embodiment. Referring to both FIGS. 1 and 2, a method is initiated in block 202, where system 102 recognizes one or more people in one or more photos associated with a target user in the social network system. In one embodiment, the photos are associated with the target user in that the target user took the photos and/or uploaded the photos to system 102.

In one embodiment, system 102 may obtain the one or more photos from a camera device when the target user takes the one or more photos. In various embodiments, the camera device may be implemented with a mobile phone, a tablet, a notebook computer, or any other suitable electronic device. In some situations, a camera device may automatically upload photos to system 102 when photos are taken. In one embodiment, older photos may also be used. For example, system 102 may receive a pre-existing photo that is uploaded or scanned by a user.

In one embodiment, to recognize the one or more people, system 102 identifies one or more faces, and applies a facial recognition algorithm to the one or more faces in the photo. Note that the term "face" and "image of a face" is used interchangeably.

In various embodiments, system 102 enables users of the social network system to opt-in or opt-out of system 102 using their faces in photos or using their identity information in recognizing people identified in photos. Also, system 102 enables users of the social network to opt-in or opt-out of system 102 using their photos for facial recognition in general.

In one embodiment, for each face in a photo, system 102 analyzes multiple features of the face and generates a feature vector. In various embodiments, a feature vector is a set of distinguishing facial characteristics or features, which include any features that make a face recognizable. Such features may include, for example, facial hair, skin color, eye color, eye distance, hair characteristics, etc.

For each face in a photo, system 102 compares the feature vector of the identified face to multiple feature vectors of known faces in a database such as social network database 106 of FIG. 1. Each known face is associated with a candidate person having a known user profile in social network database 106.

In one embodiment, social network database 106 stores images of known faces, where each known face is associated with a feature vector. Furthermore, each known face is associated with a known user of the social network system. For example, the known face is associated with a known user profile.

In various embodiments, each feature vector is associated with a feature vector score, and system 102 compares the feature vector score of the feature vector of an identified face in a photo to the feature vector scores associated with known faces. In one embodiment, system 102 may look up feature vectors of known faces in a hash table. In one embodiment, system 102 determines the candidate with the closest feature vector (to that of the identified face) to be the same person.

In one embodiment, the feature vector (of the candidate) with the highest feature vector score has the highest probability of being associated with a known user. Conversely, the feature vector with the lowest feature vector score has the lowest probability of being associated with a known user.

In some situations, there may be multiple candidates (e.g., 5 people) with closely matching feature vectors. In other words, there may be several candidates who look like the person identified in a given photo. This may be for various reasons. For, example, some people have very similar features, such as family members. Also, variations in the quality of a facial image in a photo (e.g., lighting, clarity, etc.) cause variations in feature vector scores.

In one embodiment, system 102 may obtain time stamp information and location information associated with each photo. System 102 may use this information to help in the recognition process. For example, if system 102 recognizes two possible candidates for a given face identified in a photo taken at a particular event, and system 102 knows from the database that one candidate is in the same city at that time, whereas the other candidate is in a different city, system 102 can ascertain the best candidate to associate with the face in the photo.

Various embodiments described herein, such as those described in FIG. 3 below, facilitate in narrowing potential candidates to one candidate.

Figure 3:
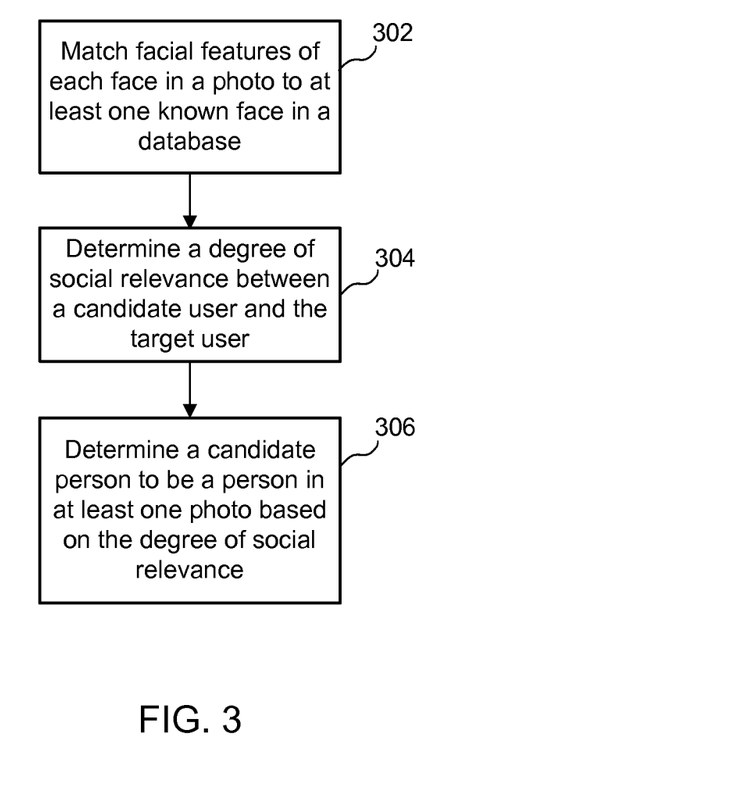
FIG. 3 illustrates an example simplified flow diagram for applying a facial recognition algorithm to one or more faces, according to one embodiment.

FIG. 3 illustrates an example simplified flow diagram for applying a facial recognition algorithm to one or more faces, according to one embodiment. Referring to both FIGS. 1 and 3, a method is initiated in block 302, where, for each face in a photo, system 102 matches facial features of the face to facial features of at least one known face in a database (e.g., stored in social network database 106 of FIG. 1), where the at least one known face is associated with a candidate person. In one embodiment, the existing faces may be associated with existing photo albums of the target user and/or with existing photo albums of any other user or users of the social network system.

In various embodiments, system 102 enables users of the social network to opt-in or opt-out of system 102 using their faces in photos or using their identity information in recognizing people identified in photos.

In block 304, in one embodiment, system 102 may determine a degree of social relevance between each candidate person and the target user. In one embodiment, the degree of social relevance may be a social relevance score. System 102 may determine the social relevance score based on a weighting function that factors in who is identified in a given photo and the social connections among the people in the photo and the target user. In alternative embodiments, the social relevance score may be based on other factors such as degrees of separation from the target user, for example.

In one scenario, assume user U1 is the target user (who takes a photo), a person who looks like user U2 (e.g., similar feature vector scores) is in the photo, and users U1 and U2 know each other. There would be a high probability that user U2 is indeed the person in the photo with user U1. Accordingly, system 102 would give user U2 as a candidate a high social relevance score. The social relevance score of user U2 would be much higher that the social relevance score of another candidate who looks like user U2 but who does not know user U1.

In another scenario, assume user U1 is the target user, users U2 and a person who looks like U3 are in a photo, user U1 knows user U2 but does not know user U3, user U2 knows U3. In various embodiments, a given user knows another user in that they are socially connected (e.g., friends, contacts, etc.) in the social network system. There would be a fairly high probability that user U3 is indeed the person in the photo with user U2. Accordingly, system 102 would give user U3 as a candidate a high social relevance score. Even if user U1 does know wither users U2 or U3, the fact that users U2 and U3 know each other maintains a higher social relevance score. In other words, being a friend of a friend carries weight with regard to the social relevance score.

In block 306, system 102 determines a candidate person to be at least one person in the photo based on the degree of social relevance. In one embodiment, system 102 may determine the candidate with the highest social relevance score to be the most likely to be the same person identified in a photo.

In various embodiments, system 102 may utilize the degree of social relevance to recognize a person in a photo based in various ways. For example, in one embodiment, system 102 may include the degree of social relevance as a part of feature vectors. In another embodiment, system 102 may first determine a group of candidates based on feature vectors without factoring in degrees of social relevance. System 102 may then narrow down the candidates to one person based on the degree of social relevance, as described in FIG. 3.

Referring again to FIG. 2, in block 204, system 102 creates one or more groups in the social network system. In one embodiment, the created groups may be based on the people recognized in the photos. For example, as described in an example above in connection with FIG. 1, group 160 of users U1 and U2 may be recognized in one photo taken by a target user. Also, group 170 of users U3 and U4 may be recognized in another photo taken by the target user. System 102 may create social network groups corresponding to the groups of users recognized in the photos. For example, system 102 may create a first group that includes users U1 and U2, and may create a second group that includes users U3 and U4. In various embodiments, the target user may be any one of users U1, U2, U3, U4, or another user of the social network system.

In various embodiments, system 102 enables people in the photos to opt-in or opt-out of system 102 adding them to newly created groups generally and/or to groups associated with particular users of the social network system.

A "group" as used in the context of the embodiments described herein is a social network group. As such, the term "group" may be used interchangeably with the phrase "social network group." In various embodiments, a social network group may be a set of socially connected users in the social network. For example, a social network group may be a group of friends or a group of connections.

In one embodiment, system 102 may create a group based on multiple pictures from different people. For example, if two users attend an event and each take photos, system 102 may combine the people in the photos to create a social network group.

A benefit of the embodiments described herein is that system 102 creates groups that naturally include people from specific events, meetings, trips, excursions, and other group activities, because the groups are based on people recognized in photos often from such group activities.

In one embodiment, the one or more groups may include the target user, because the target user took the photos and probably knows some if not all people in the photos. In one embodiment, the one or more groups include at least one person recognized in the one or more photos. For example, a given group may include at least one person recognized in the photo and the target user who took the photo. In some cases, the target user may also be a person recognized in a photo. This situation may happen, for example, where the target user has someone else to take the photo so that the target user is also in the photo. In one embodiment, the one or more groups may include multiple users recognized in the one or more photos.

In one embodiment, system 102 may label each created group. The label may be a random number, date, location, etc. System 102 also enables the target user to change the label.

In one embodiment, system 102 enables the target user to verify that the people recognized in the at least one photo are correctly recognized. In one embodiment, system 102 causes profile photos of recognized users to be displayed in association with the created group. In one embodiment, system 102 includes one or more photos from which the users in the group where recognized. In one embodiment, other users in the group may also verify that the people recognized in the at least one photo are correctly recognized.

In one embodiment, system 102 enables the target user to modify identification information associated with one or more people in the group if any person is incorrectly recognized. For example, system 102 may enable the target users to manually add names to the group.

In one embodiment, if a face in a photo is not recognized, system 102 may include a placeholder (e.g., an empty box) in the group. System 102 may prompt the target user to manually fill in identifying information for that person. For example, the target user can look at one or more photos from which the people in the group were recognized. The target user can then determine which users are not yet listed in the group. The target user also has the option of removing the placeholder.

In block 206, system 102 associates the one or more groups with the target user. In one embodiment, system 102 may provide the group to the target user. In various embodiments, system 102 may enable the target user to include the one or more groups in a list or cluster of existing groups associated with the target user (e.g., associated with the profile of the target user). System 102 may cause the list or cluster of groups to be displayed to the target user in the social network pages of target user. System 102 may enable the target user to elect whether to make each group associated with the target user visible to other users, and, if visible, may enable the target user to indicate which other users are permitted to view the each group.

In one embodiment, system 102 notifies the people recognized in the at least one photo that the group has been created.

As noted above, in various embodiments, system 102 enables people in the photos to opt-in or opt-out of system 102 adding them to newly created groups generally and/or to groups associated with particular users of the social network system.

In one embodiment, system 102 may send an invitation to join the group to the target user and to the one or more people recognized in the one or more photos. In such embodiments, recipients of such invitations may have the option to accept or not accept the invitations. If a given recipient accepts the invitation, that user would join the group and be associated with the group.

In one embodiment, system 102 enables users to associate assets with the group. Such assets may include content, for example, photos, audio tracks, event information, etc. Users who are included in the group may then access such assets.

While system 102 is described as performing the steps as described in the embodiments herein, any suitable component or combination of components of system 102 or any suitable processor or processors associated with system 102 may perform the steps described.

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time.

Embodiments described herein provide various benefits. For example, embodiments described herein also increase overall engagement among end-users in a social networking environment by facilitating the creation of groups among users of the social network system.

Figure 4:
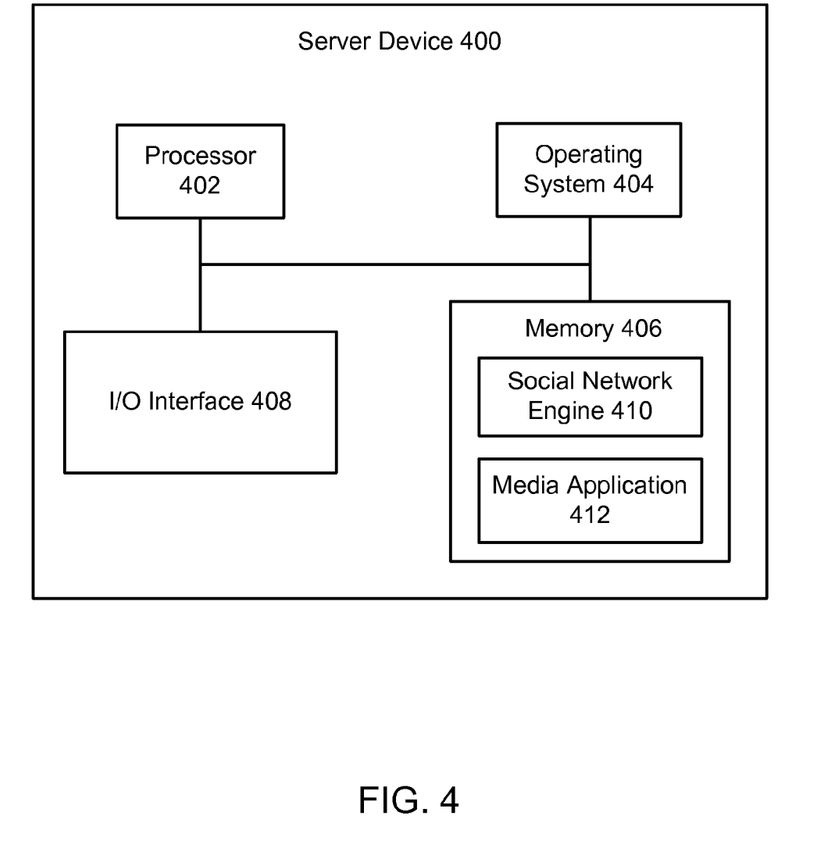
FIG. 4 illustrates a block diagram of an example server device, which may be used to implement the embodiments described herein.

FIG. 4 illustrates a block diagram of an example server device 400, which may be used to implement the embodiments described herein. For example, server device 400 may be used to implement server device 104 of FIG. 1, as well as to perform the method embodiments described herein. In one embodiment, server device 400 includes a processor 402, an operating system 404, a memory 406, and an input/output (I/O) interface 408. Server device 400 also includes a social network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, social network engine 410, and media application 412. These blocks 402, 404, 406, 408, 410, and 412 may represent multiple processors, operating systems, memories, I/O interfaces, social network engines, and media applications. In other embodiments, server device 400 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method comprising:
   recognizing at least one person in at least one photo associated with a target user in a social network system, wherein the recognizing is based at least in part on social relevance, wherein the recognizing of the at least one person includes identifying at least one face, and applying a facial recognition algorithm to the at least one face, wherein the applying of the facial recognition algorithm to the at least one face comprises:
      matching facial features of the at least one face to facial features of at least one known face in a database, wherein the at least one known face is associated with a candidate person;
      determining a degree of social relevance between the candidate person and the target user; and
      determining the candidate person to be the at least one person in the at least one photo based on the degree of social relevance;
   in response to recognizing the at least one person, creating a new group in the social network system from the recognized at least one person in the at least one photo, wherein the new group is a previously non-existent social network group that includes the at least one person recognized in the at least one photo, and wherein a social network group is a set of socially connected users in the social network system;
   enabling the target user to verify that the at least one person recognized in the at least one photo is correctly recognized;
   enabling the target user to modify identification information associated with one or more people in the group if any person is incorrectly recognized; and
   associating the new group with the target user.

2. A computer-implemented method comprising:
   recognizing at least one person in at least one photo associated with a target user in a social network system, wherein the recognizing is based at least in part on social relevance;
   in response to recognizing the at least one person, creating a new group in the social network system from the recognized at least one person in the at least one photo, wherein the new group is a previously non-existent social network group that includes the at least one person recognized in the at least one photo, and wherein a social network group is a set of socially connected users in the social network system; and
   associating the new group with the target user.

3. The method of claim 2, wherein the obtaining of the at least one photo comprises obtaining the at least one photo from a camera device when the target user takes the at least one photo.

4. The method of claim 2, wherein the recognizing of the at least one person comprises:
   identifying at least one face; and
   applying a facial recognition algorithm to the at least one face.

5. The method of claim 2, wherein the recognizing is based at least in part on a degree of social relevance between a candidate person and the target user.

6. The method of claim 2, wherein the recognizing of the at least one person comprises:
   identifying at least one face; and
   applying a facial recognition algorithm to the at least one face, wherein the applying of the facial recognition algorithm to the at least one face comprises:
      matching facial features of the at least one face to facial features of at least one known face in a database, wherein the at least one known face is associated with a candidate person;
      determining the degree of social relevance between the candidate person and the target user; and
      determining the candidate person to be the at least one person in the at least one photo based on the degree of social relevance.

7. The method of claim 2, further comprising enabling the target user to verify that the at least one person recognized in the at least one photo is correctly recognized.

8. The method of claim 2, further comprising:
   enabling the target user to verify that the at least one person recognized in the at least one photo is correctly recognized; and
   enabling the target user to modify identification information associated with one or more people in the new group if any person is incorrectly recognized, wherein the enabling includes enabling the target user to add names to the new group.

9. The method of claim 2, further comprising providing the new group to the target user.

10. The method of claim 2, further comprising notifying the at least one person recognized in the at least one photo that the new group has been created.

11. The method of claim 2, further comprising sending an invitation to join the new group to the target user and the at least one person recognized in the at least one photo.

12. A system comprising:
   one or more processors; and
   logic encoded in one or more tangible media for execution by the one or more processors and when executed operable to perform operations comprising:
      recognizing at least one person in the at least one photo associated with a target user in a social network system, wherein the recognizing is based at least in part on social relevance;
      in response to recognizing the at least one person, creating a new group in the social network system from the recognized at least one person in the at least one photo, wherein the new group is a previously non-existent social network group that includes the at least one person recognized in the at least one photo, and wherein a social network group is a set of socially connected users in the social network system; and associating the new group with the target user.

13. The system of claim 12, wherein, to obtain the at least one photo, the logic when executed is further operable to perform operations comprising obtaining the at least one photo from a camera device when the target user takes the at least one photo.

14. The system of claim 12, wherein, to recognize the at least one person, the logic when executed is further operable to perform operations comprising:

identifying at least one face; and applying a facial recognition algorithm to the at least one face.

15. The system of claim 12, wherein the recognizing is based at least in part on social relevance between a candidate person and the target user.

16. The system of claim 12, wherein, to recognize the at least one person, the logic when executed is further operable to perform operations comprising:

identifying at least one face; and applying a facial recognition algorithm to the at least one face, wherein the applying of the facial recognition algorithm to the at least one face comprises:

matching facial features of the at least one face to facial features of at least one known face in a database, wherein the at least one known face is associated with a candidate person;

determining the degree of social relevance between the candidate person and the target user; and determining the candidate person to be the at least one person in the at least one photo based on the degree of social relevance.

17. The system of claim 12, wherein the logic when executed is further operable to perform operations comprising enabling the target user to verify that the at least one person recognized in the at least one photo is correctly recognized.

18. The system of claim 12, wherein the logic when executed is further operable to perform operations comprising:

enabling the target user to verify that the at least one person recognized in the at least one photo is correctly recognized; and enabling the target user to modify identification information associated with one or more people in the new group if any person is incorrectly recognized.

19. The system of claim 12, wherein the logic when executed is further operable to perform operations comprising providing the new group to the target user.

20. The system of claim 12, wherein the logic when executed is further operable to perform operations comprising notifying the at least one person recognized in the at least one photo that the new group has been created.

* * * * *